(12) United States Patent
Ghosh et al.

(10) Patent No.: US 10,057,854 B2
(45) Date of Patent: Aug. 21, 2018

(54) WAKING UP INTERNET OF THINGS DEVICES IN A HIGH EFFICIENCY WIRELESS LOCAL-AREA NETWORK

(71) Applicant: Intel IP Corporation, Santa Clara, CA (US)

(72) Inventors: Chittabrata Ghosh, Fremont, CA (US); Yaron Alpert, Hod Hasharoni (IL)

(73) Assignee: Intel IP Corporation, Santa Clara, CA (US)

( * ) Notice: Subject to any disclaimer, the term of this patent is extended or adjusted under 35 U.S.C. 154(b) by 211 days.

(21) Appl. No.: 14/868,643

(22) Filed: Sep. 29, 2015

(65) Prior Publication Data

US 2016/0366644 A1 Dec. 15, 2016

Related U.S. Application Data

(60) Provisional application No. 62/174,007, filed on Jun. 11, 2015.

(51) Int. Cl.

| | |
|---|---|
| *H04L 12/50* | (2006.01) |
| *H04W 52/02* | (2009.01) |
| *H04L 5/00* | (2006.01) |
| *H04W 56/00* | (2009.01) |
| *H04W 4/70* | (2018.01) |
| *H04W 84/12* | (2009.01) |

(52) U.S. Cl.
CPC ....... *H04W 52/0229* (2013.01); *H04L 5/0007* (2013.01); *H04W 4/70* (2018.02); *H04W 56/001* (2013.01); *H04W 84/12* (2013.01); *Y02D 70/00* (2018.01); *Y02D 70/1226* (2018.01); *Y02D 70/1262* (2018.01); *Y02D 70/142* (2018.01); *Y02D 70/144* (2018.01); *Y02D 70/146* (2018.01); *Y02D 70/26* (2018.01)

(58) Field of Classification Search
CPC .......................... H04W 52/0235; H04W 52/02
See application file for complete search history.

(56) References Cited

U.S. PATENT DOCUMENTS

| | | | | |
|---|---|---|---|---|
| 7,430,673 B2 * | 9/2008 | Kardach | ............... | G06F 1/3203 713/300 |
| 2013/0138982 A1 * | 5/2013 | Oksman | ................ | H04B 3/544 713/300 |

(Continued)

*Primary Examiner* — Shukri Taha
(74) *Attorney, Agent, or Firm* — Schwegman Lundberg & Woessner, P.A.

(57) ABSTRACT

Apparatuses, computer readable media, and methods for waking up Internet of Things (IoT) devices in a high-efficiency wireless local-area network are disclosed. The apparatus of a high-efficiency wireless local-area network (HEW) device may include processing circuitry and transceiver circuitry configured to generate a packet for one or more stations comprising one or more sub-channels. Each sub-channel may include a common wake up physical synchronization in a physical layer and a station dedicated wake up preamble in a media access control (MAC) layer. The station dedicated wake up preamble may include a wake-up identifier for a corresponding station of the one or more stations. The processing circuitry and transceiver circuitry may be further configured to transmit the packet to the one or more stations in accordance with orthogonal frequency division multiple access (OFDMA).

17 Claims, 6 Drawing Sheets

(56) References Cited

U.S. PATENT DOCUMENTS

| | | | |
|---|---|---|---|
| 2014/0120962 A1* | 5/2014 | Merlin | H04W 68/02 455/466 |
| 2014/0211678 A1* | 7/2014 | Jafarian | H04W 52/0216 370/311 |
| 2015/0334650 A1* | 11/2015 | Park | H04W 52/0209 370/311 |

* cited by examiner

WAKING UP INTERNET OF THINGS DEVICES IN A HIGH EFFICIENCY WIRELESS LOCAL-AREA NETWORK

PRIORITY CLAIM

This application claims the benefit of priority under 35 USC 119(e) to U.S. Provisional Patent Application Ser. No. 62/174,007, filed Jun. 11, 2015, which is incorporated herein by reference in its entirety.

TECHNICAL FIELD

Embodiments relate to Institute of Electrical and Electronic Engineers (IEEE) 802.11. Some embodiments relate to high-efficiency wireless local-area networks (HEWs). Some embodiments relate to IEEE 802.11ax. Some embodiments relate to wake up packets for Internet of Things (IoT) stations that may be IEEE 802.11ax stations.

BACKGROUND

The Internet of Things (IoT) is enabling many wireless devices to be deployed in wireless local-area network (WLAN). However, the IoT wireless devices are often battery constrained and yet need to communicate with central devices to download and upload data. Additionally, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
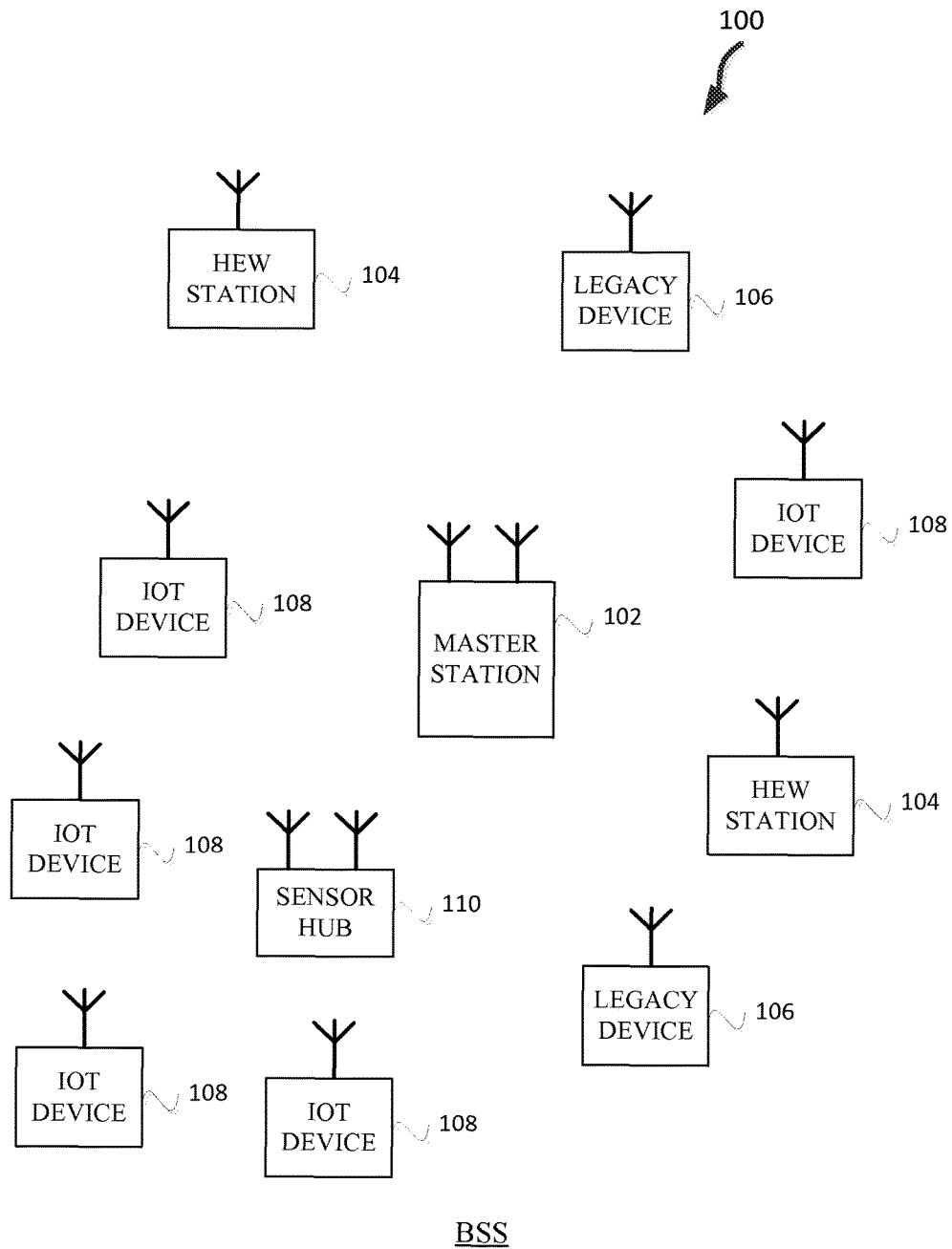
FIG. 1 illustrates a wireless network in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104, a plurality of legacy (e.g., IEEE 802.11n/ac) devices 106, a plurality of IoD devices 108 (e.g., IEEE 802.11ax), and a sensor hub 110.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The legacy devices 106 may operate in accordance with one or more of IEEE 802.11 a/b/g/n/ac/ad/af/ah/aj, or another legacy wireless communication standard. The legacy devices 106 may be STAs or IEEE STAs. The HEW STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques.

The IoT devices 108 may operate in accordance with 802.11ax or another standard of 802.11. The IoT devices 108 may operate on a smaller sub-channel than other the HEW stations 104. For example, the IoT devices 108 may operate on 2.03 MHz sub-channels. In some embodiments, the IoT devices 108 are not able to transmit on a 20 MHz sub-channel to the master station 102 with sufficient power for the master station 102 to receive the transmission. In some embodiments, the IoT devices 108 are not able to receive on a 20 MHz sub-channel and must use a small sub-channel such as 2.03 MHz.

The IoT devices 108 may be battery constrained. The IoT devices 108 may be sensors designed to measure one or more specific parameters of interest such as temperature sensor, humidity, etc. The IoT devices 108 may be location-specific sensors. Some IoT devices 108 may be connected to a sensor hub 110. The IOT devices 108 may upload data to the sensor hub 110. The sensor hubs 110 may upload the data to an access gateway (not illustrated) that connects several sensor hubs 110 and can connect to a cloud sever. The master station 102 may act as the access gateway in accordance with some embodiments. The master station 102 may act as the sensor hub 110 in accordance with some embodiments.

In some embodiments, the IoT devices 108 need to consume very low average power in order to perform a frame exchange with the sensor hub 110 and/or master station 102. The IoT devices 108 may be densely deployed.

In some embodiments, the IoT devices 108 may have different sleep states. The IoT devices 108 may have three sleep states. A micro sleep state where the IoT device 108 may decode the PHY preamble and determine whether a packet is relevant to the IoT device 108 and enter the micro sleep state for the duration of the physical layer convergence procedutre (PLCP) protocol data unit (PPDU) if the packet is not relevant to the IoT device 108. For example, the IoT device 108 may go into the micro sleep state for a duration of a single uplink (UL) or downlink (DL) packet, or a duration of a spatial re-use in an overlapping BSS (OBSS).

A shallow sleep state where the IoT device 108 determines the protection duration from the first packet and enter this sleep state till end of that duration. For example, the IoT device 108 may receive a trigger frame and enter the shallow sleep for the duration of a transmission opportunity. A deep sleep state where sleep state where the IoT device 108 may enter the deep sleep state for one or multiple beacon intervals.

The following is an example of a micro sleep state. The IoT device 108 may have a MAC processor powered up, a faster clock running, phase-locked loop (PLL) on. The power consumption may be approximately 5 mili Watts (mW). The latency to return to active state may be 0-100μ, seconds (μs) and the radio frequency and modem may be off.

The following is an example of a shallow sleep state. The MAC processor may be in retention mode. The clock speed may be a slower clock speed. The PLL may be in a low power mode. Power consumption may be around 1 milli Watts (mW). A latency to return to active state may be less than 500 μs. The RF and modem may be off.

The following is an example of a deep sleep state. The power for transmitting and receiving signals may be off. Power consumption may be approximately 0-100 μW. A latency to return to active state may be greater than 3 ms.

In some embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HEW frame may be configured for transmitting a number of spatial streams, which may be in accordance with MU-MIMO. In other embodiments, the master station 102, HEW STA 104, and/or legacy device 106 may also implement different technologies such as code division multiple access (CDMA) 2000, CDMA 2000 1x, CDMA 2000 Evolution-Data Optimized (EVDO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and subchannel information. During the HEW control period, HEW STAs 104 may communicate with the master station 102 in accordance with a non-contention based multiple access technique such as OFDMA or MU-MIMO.

This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating.

In accordance with some embodiments, during the master-sync transmission the HEW STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW device 104 and/or the master station 102 are configured to perform the methods and functions herein described in conjunction with FIGS. 1-6.

Figure 2:
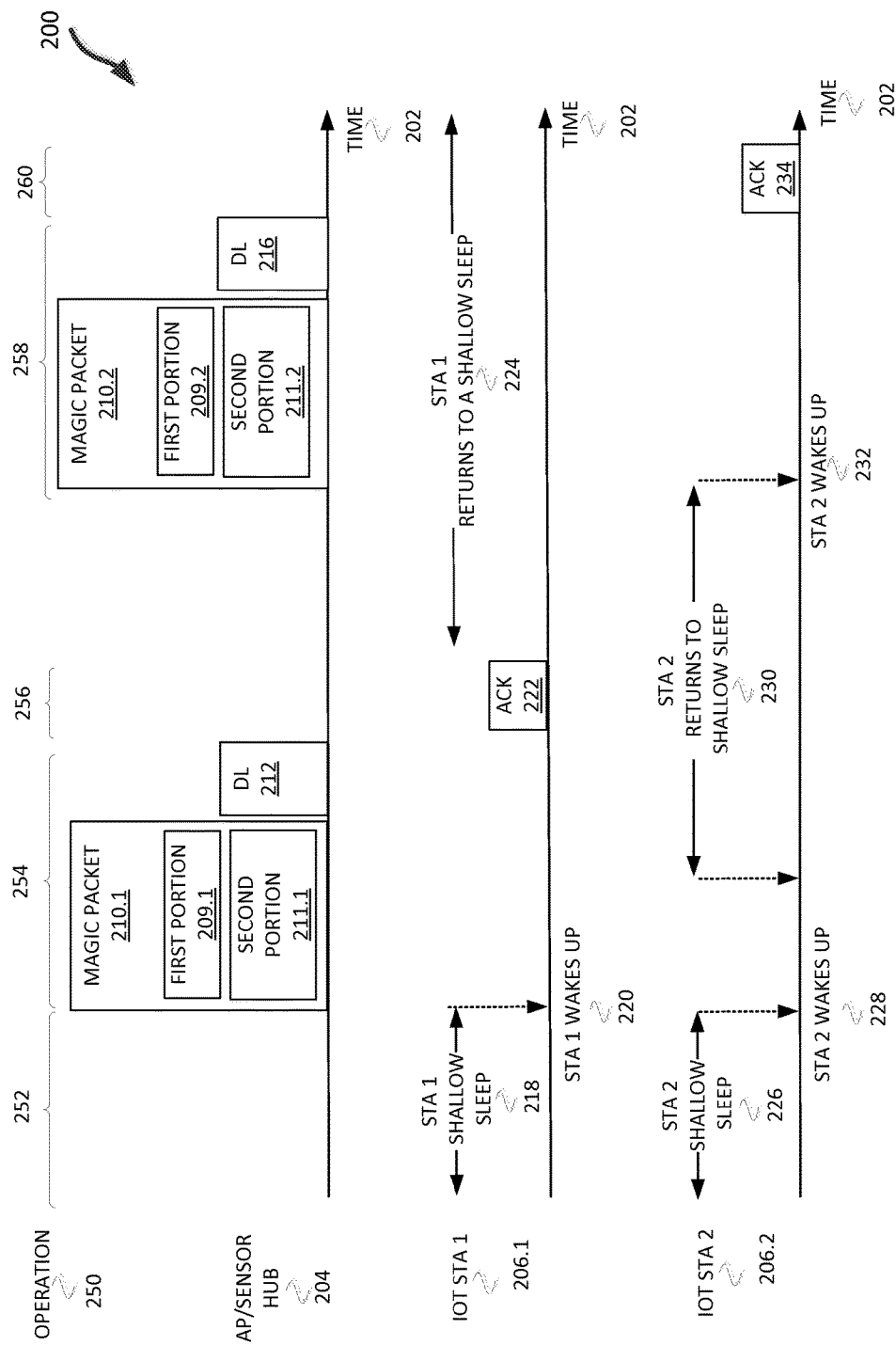
FIG. 2 illustrates a method 200 for waking up Internet of Things (IoTs) devices in accordance with some embodiments.

FIG. 2 illustrates a method 200 for waking up Internet of Things (IoTs) devices in accordance with some embodiments. Illustrated in FIG. 2 is time 202 along a horizontal axis and frequency with a device transmitting a long a vertical axis. Operations 250 are listed along the top. The device transmitting may be an AP/sensor hub 204, IoT STA 1 206, or IoT STA 2 208. The AP/Sensor hub 204 may be a master station 102 or sensor hub 110. The IoT STA 1 206 and IoT STA 2 208 may be IoT devices 108. The magic packet 210 may be the same or similar to magic packets 300, 400, 500 as described herein in conjunction with FIGS. 3-5.

The magic packet 210 may include a first portion 209 and a second portion 211. The first portion 209 may be a portion that includes a physical layer indication to the IoT devices 108. For example, the first portion 209 may be a common wake up PHY synchronization 310 that when decoded by the IoT device 108 indicates that the IoT device 108 should continue to decode the magic packet 210. The first portion 209 may provide timing synchronization. The IoT device 108 may partially wake-up after receiving the first portion 209 so that it can decode the second portion 211 which may be a MAC portion of the magic packet 210.

The second portion 211 may be a portion that includes an indication for a specific IoT device 108 or a group of IoT devices 108. For example, the second portion 211 may be a STA/AP dedicated wake up preamble 312 as disclosed in conjunction with FIG. 3. The magic packets 210 may be the same as or similar to magic packets 300, 400, 500 as described in conjunction with FIGS. 3-5. The magic packets 210 may be transmitted on a sub-channel that may be smaller than a channel bandwidth used by HEW STAs 104. For example, the sub-channel may be 2 MHz or 2.03 MHz. The second portion 211 may be a media access control (MAC) portion where the IoT STA 108 may have to wake-up portions of the IoT STA 108 so that the IoT STA 108 can decode a MAC portion of the magic packet 210.

The method 200 may begin at operation 252 where IoT STA 1 206.1 and IoT STA 2 206.2 are in a shallow sleep 218, 226, respectively. In some embodiments, the shallow sleep may be the same or similar as disclosed in conjunction with FIG. 1.

The method 200 continues at operation 254 with the AP/sensor hub 204 transmitting a magic packet 210.1. IoT STA 1 206.1 and IoT STA 2 206.2 may receive the magic packet 210.1. The magic packet 210.1 may begin with the first portion 209.1 such as a common wake up PHY synch 310. In some embodiments, the magic packet 210.1 may have portions that are before the first portion 209.1.

The IoT STAs 206 may receive the first portion 209.1 of the magic packet 210.1 that includes a common wake up PHY synchronization 310. The IoT STAs 206, as illustrated in FIG. 2, determine that the first portion of the magic packet for STA 1 210 indicates that the IoT STAs 206 should decode additional portions of the magic packet 210.1. Both IoT STAs 206 may wake-up from the shallow sleep to decode more of the magic packet 210.1. The magic packet 210.1 may include a second portion 211.1 that may be a STA/AP dedicated wake up preamble 312.

IoT STA 2 206.2 may determine from the second portion 211.1 that the magic packet 210.1 is not for it. IoT STA 2 206.2 may then return to shallow sleep 230. IoT STA 1 206.1 may determine based on the second portion 211.1 that the magic packet 210.1 is for the IoT STA 1 206.1. IoT STA 1 206.1 may wake-up to receive the remainder of the magic packet 210.1, which may include data or management instructions. The AP/sensor hub 204 may transmit downlink 212, which may be data or instructions, for the IoT STA 1 206.1. The The method 200 continues at operation 256 with IoT STA 1 206.1 transmitting ACK 222. The IoT STA 206.1 may transmit an acknowledgement of the magic packet 210 and DL 212 to the AP/sensor hub 204. The IoT STA 206.1 may then return to a shallow sleep 224. The IoT STA 206.1 may enter the shallow sleep based on a schedule so that it will not wake up until a next beacon time or another pre-determined time.

The method 200 continues at operation 258 with the AP/sensor hub 204 transmitting magic packet 210.2. IoT STA 206.1 may not decode any of magic packet 210.2 as IoT STA 206.1 may be in a sleep schedule and not wake-up until a pre-determined time.

IoT STA 2 206.2 may receive the first portion 209.2 and determine to continue to decode the magic packet 210.1. IoT STA 2 206.2 may wake-up a portion of the IoT STA 2 206.2 to decode a MAC portion of the magic packet 210. The IoT STA 2 206.2 may determine based on the second portion 211.2 that the magic packet 210.2 is for the IoT STA 2 206.2. The IoT STA 2 206.2 may decode the remainder of the magic packet 210 and the DL 216. The method 200 may continue at operation 260 with the IoT STA 206.2 transmitting an ACK 234 to the AP/sensor hub 204 to acknowledge the magic packet 210.2 and the DL 216. The IoT STA 2 206.2 may return to a shallow sleep and not wake-up until a predetermined time that may be determined based on a schedule.

IoT STAs 206 may be in scheduled or continuous sleep operation modes. During these continuous or sleep operation modes the IoT STAs 206 may be a narrow band low power sleep mode where the IoT STAs 206 try to detect magic packets 210. The IoT STAs 206 may share their operating characteristics with the AP/Sensor hub 204 when they associate with the master station 102.

The IoT STAs 206 may be battery constrained so that it is better to keep the IoT STAs 206 in sleep mode as long as possible. The IoT STAs 206 may have pre-negotiated or assigned, predefined wake-up intervals. The AP/sensor hub 204 may negotiate or assign wake-up intervals to the IoT STAs 206. In some embodiments, the IoT STAs 206 may wake-up in a predefined interval if the IoT STA 206 has a frame to transmit to the AP/sensor hub 204, or the IoT STA 206 receives a magic packet 210.

In some embodiments, the sub-channel 504 may be indicated to the IoT STA 206 by the AP/sensor hub 204. For example, the AP/sensor hub 204 may indicate which 20 MHz sub-channel and which 2 MHz sub-channel of the 20 MHz sub-channel for the IoT STA 206 to monitor for magic packets 210, 300, 400, 500.

Figure 3:
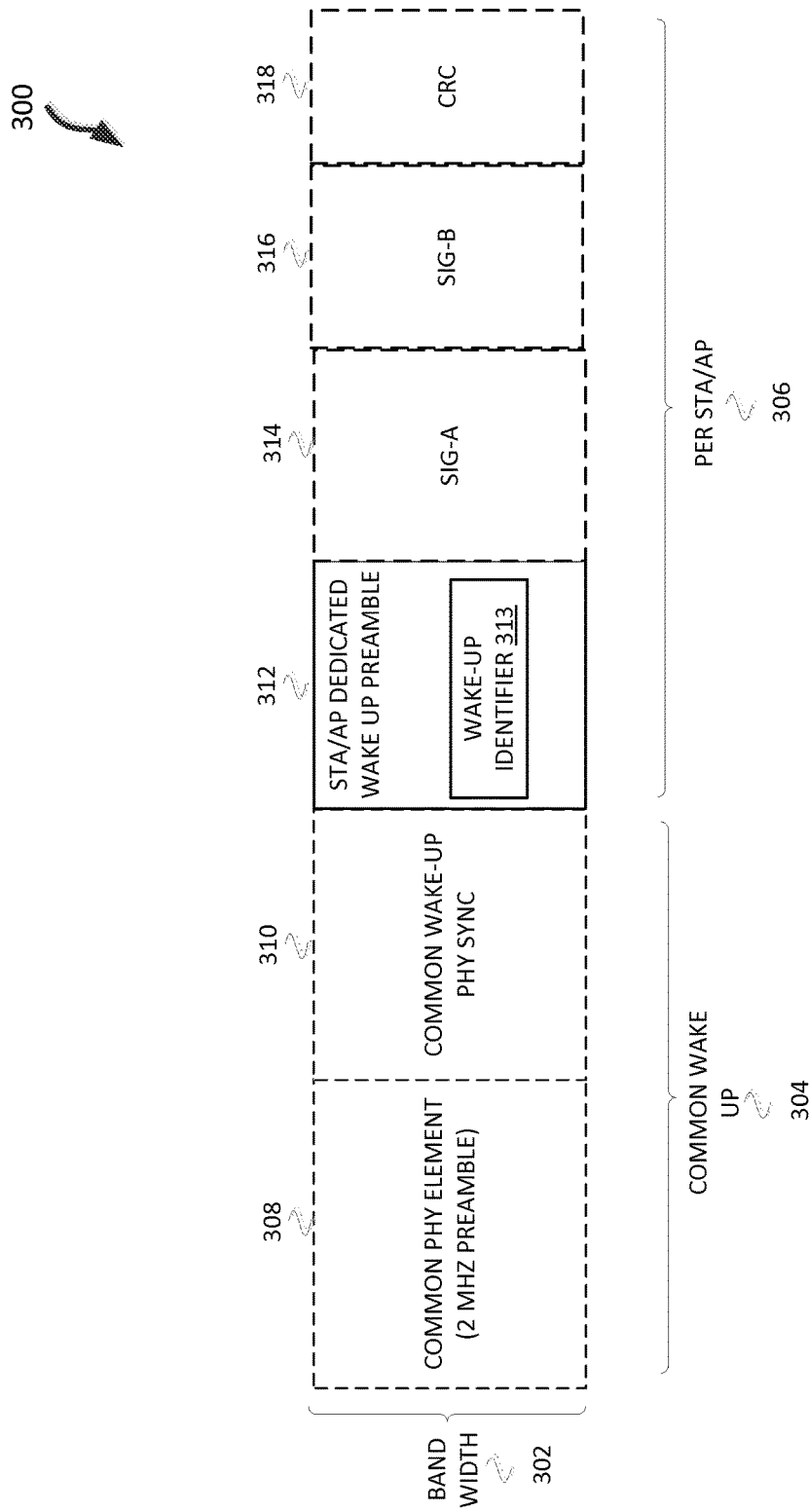
FIG. 3 illustrates a magic packet 300 in accordance with some embodiments.

FIG. 3 illustrates a magic packet 300 in accordance with some embodiments. The magic packet 300 may include common PHY element 308 (optional), common wake-up PHY synchronization 310 (optional), STA/AP dedicated wake-up preamble 312, signal field A (SIG-A) 314 (optional), signal field B (SIG-B) 316 (optional), and cyclic redundancy check (CRC) 318 (optional). In some embodiments, the magic packet 300 comprises a common wake up 304 and a per STA/AP 306. The magic packet 300 may be transmitted on a sub-channel with a bandwidth 302 that is smaller than 20 MHz. For example, the magic packet 300 may be transmitted on a bandwidth 302 of 2.03 MHz or 2 MHz. The magic packet 300 may be transmitted on 26 data tones.

In some embodiments, the magic packet 300 includes a common PHY element 308 and a common wake-up PHY synchronization 310. The common PHY element 308 and common wake-up PHY synchronization 310 provides time and frequency synchronization, respectively, for the IoT STAs 108.

The STA/AP dedicated wake-up preamble 312 may be a training sequence. The STA/AP dedicated wake-up preamble 312 may include a wake-up identifier 313. The wake-up identifier 313 may be the training sequence. The wake-up identifier 313 may be unique signage that is negotiated when the IoT device 108 associates with the master station 102. The wake-up identifier 313 may indicate a specific device or it may be a group identifier.

In some embodiments, the magic packet 300 includes a SIG-A 314. The SIG-A 314 field may include several sub-fields for the IoT STA 108 identified by STA/AP dedicated wake-up preamble 312. The sub-fields may include one or more of: an association identification (AID), a channel bandwidth (e.g., 20 MHz), an indication of which of the possible four 20 MHz channels, and a sub-channel bandwidth (e.g., 2 MHz) and its location within the 20 MHz channel.

In some embodiments, the magic packet 300 includes a SIG-B 316. The SIG-B 316 may include sub-fields for the IoT STA 108 identified by the STA/AP dedicated wake-up preamble 312. The sub-fields may include one or more of: an indication of a spatial stream for MU-MIMO, and a modulation and coding scheme for subsequent portions of the magic packet 300.

In some embodiments, the magic packet 300 includes a CRC 318 field. The CRC 318 field may be to verify the information that is sent is correct. The CRC 318 may use a cyclic redundancy check (CRC). The CRC 318 may reduce the probability of a mistaken wake-up of a IoT STA 108. In some embodiments, the master station 102 may determine to use the CRC 318 field if a misdetection probability is above a threshold.

Figure 4:
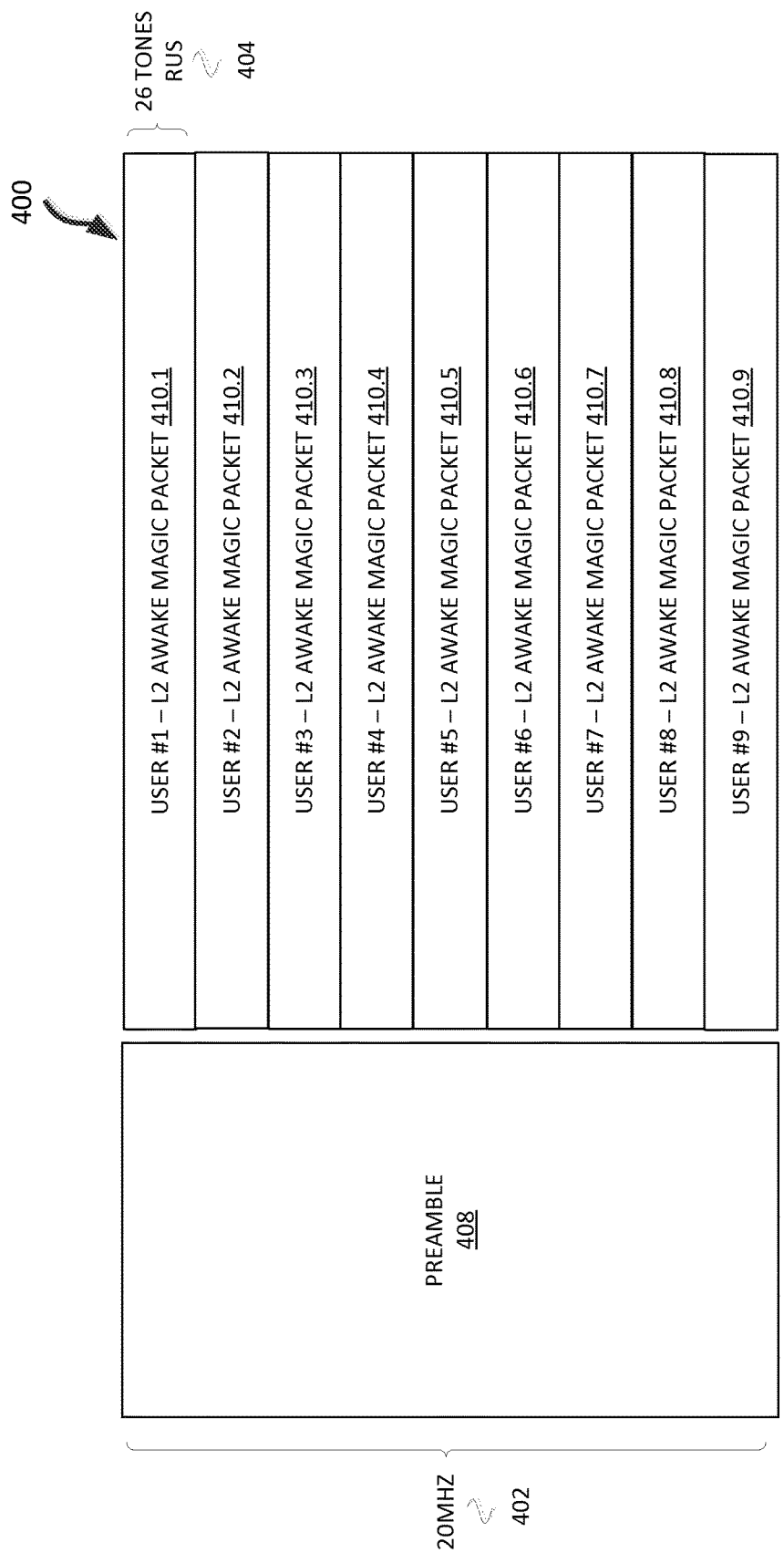
FIG. 4 illustrates nine magic packets 400 in a 20 MHz sub-channel in accordance with some embodiments.

FIG. 4 illustrates nine magic packets 400 in a 20 MHz sub-channel in accordance with some embodiments. Illustrates in FIG. 4 is a preamble 408, and user #1-#9 L2 awake magic packets 410. FIG. 4 illustrates that the portion of the magic packet 400 for each IoT STA 108 may be combined and transmitted together with a preamble 408 that may be a legacy preamble. The preamble 408 may be a legacy preamble that is 20 is in duration. Each user#1-#9 L2 awake magic packet 410 may be a 26 tone resource unit 404. Each user#1-#9 L2 awake magic packet 410 may be a magic packet 300 as described in conjunction with FIG. 3 with the wake-up identifier 313 identifying the corresponding user #.

Figure 5:
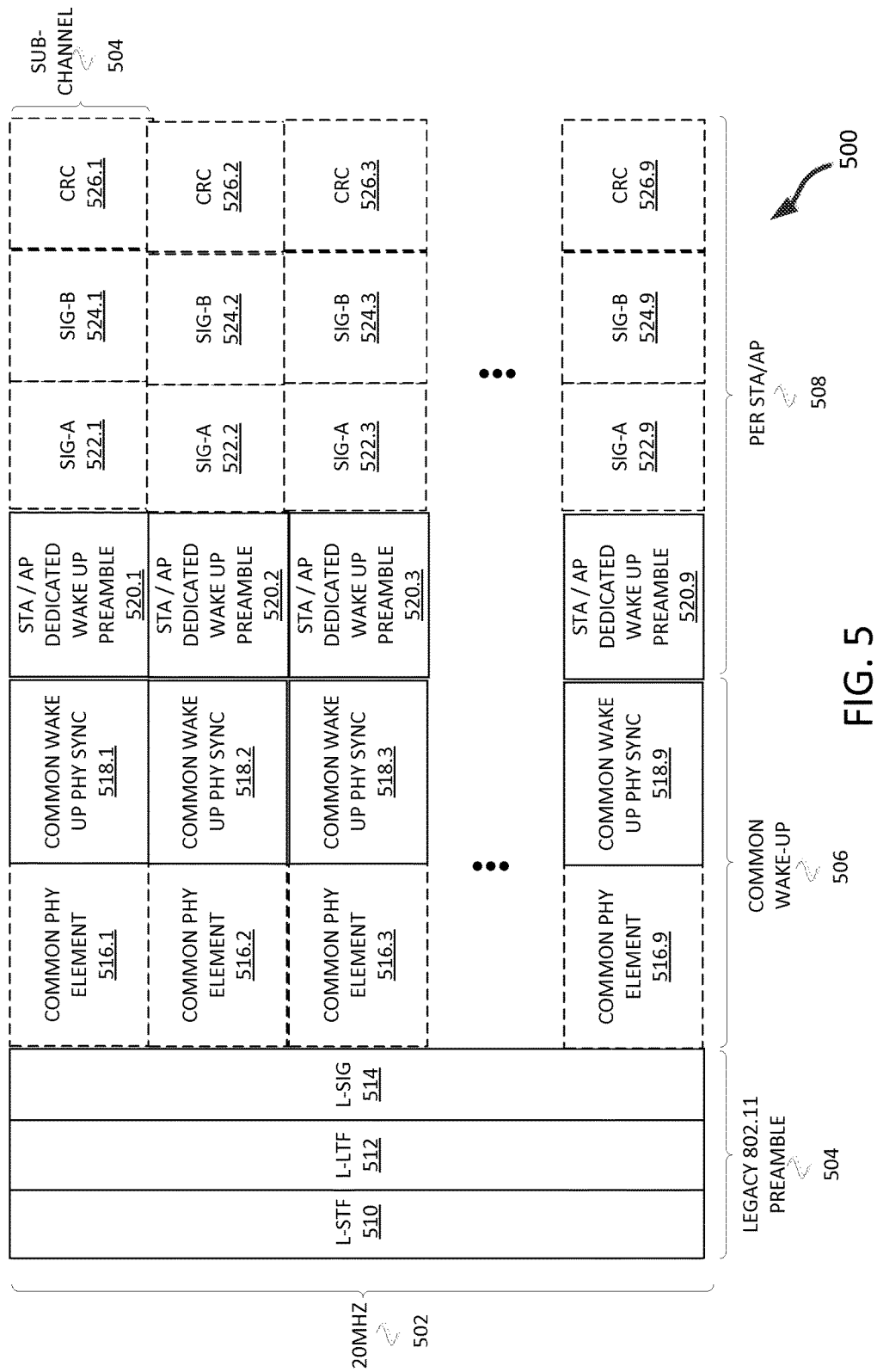
FIG. 5 illustrates a complete magic packet 500 in accordance with some embodiments.

FIG. 5 illustrates a complete magic packet 500 in accordance with some embodiments. Illustrated in FIG. 5 is legacy 802.11 preamble 504, common wake-up 506, and per STA/AP 508. The complete magic packet 500 may be transmitted on a 20 MHz channel and each magic packet is transmitted on a sub-channel 504. Examples of the sub-channel 504 include 2 MHz, 2.03 MHz, or 26 data tones. The legacy 802.11 preamble 504 may be a legacy preamble that is 20 μs in duration. The legacy 802.11 preamble 504 may include L-STF 510, L-LTF 512, and L-SIG 514, which may be the same or similar as described in conjunction with FIG. 3.

The common wake-up 506 includes common physical element 516 and common wake-up physical synchronization 518 which may be the same or similar as described in conjunction with FIG. 3. The per STA/AP 508 may include SIG-A 522, SIG-B 524, and CRC 526 which may be the same or similar as described in conjunction with FIG. 3.

Some embodiments have the technical effect of extending the amount of time that IoT devices 108 may remain in sleep state and thus lowering the power consumption of the IoT devices 108. Some embodiments have the technical effect of using less power by enabling the IoT devices 108 to remain in a sleep mode or shallow sleep mode for longer periods of time. For example, the first portion 208 (see FIG. 2) may enable the IoT devices 108 to keep a MAC layer decoder in a sleep mode until the first portion 208 is decoded.

Figure 6:
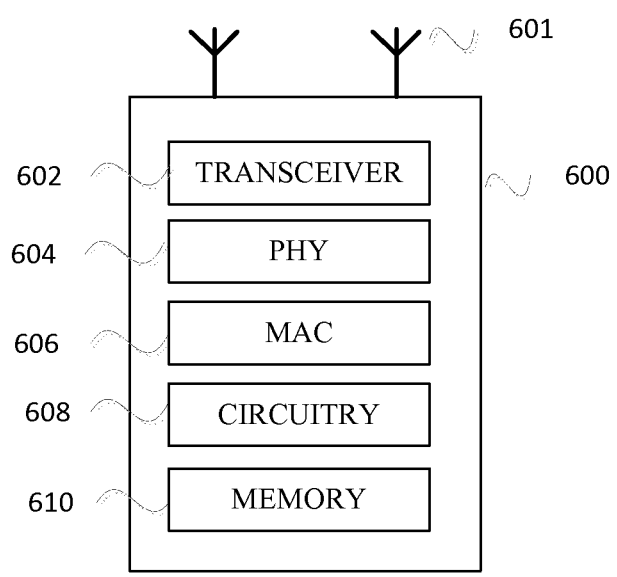
FIG. 6 illustrates a HEW device 600 in accordance with some embodiments.

FIG. 6 illustrates a HEW device 600 in accordance with some embodiments. HEW device 600 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 600 may be suitable for operating as master station 102 (FIG. 1) or a HEW STA 104 (FIG. 1). In accordance with embodiments, HEW device 600 may include, among other things, a transmit/receive element 601 (for example an antenna), a transceiver 602, physical (PHY) circuitry 604, and media access control (MAC) circuitry 606. PHY circuitry 604 and MAC circuitry 606 may be HEW compliant layers and may also be compliant with one or more legacy IEEE 802.13 standards.

MAC circuitry 606 may be arranged to configure packets such as a physical layer convergence procedure (PLCP) protocol data unit (PPDUs) and arranged to transmit and receive PPDUs, among other things. HEW device 600 may also include circuitry 608 and memory 610 configured to perform the various operations described herein. The circuitry 608 may be coupled to the transceiver 602, which may be coupled to the transmit/receive element 601. While FIG. 6 depicts the circuitry 608 and the transceiver 602 as separate components, the circuitry 608 and the transceiver 602 may be integrated together in an electronic package or chip.

In some embodiments, the MAC circuitry 606 may be arranged to contend for a wireless medium during a contention period to receive control of the medium for the HEW control period and configure an HEW PPDU. In some embodiments, the MAC circuitry 606 may be arranged to contend for the wireless medium based on channel contention settings, a transmitting power level, and a CCA level.

The PHY circuitry 604 may be arranged to transmit the HEW PPDU. The PHY circuitry 604 may include circuitry for modulation/demodulation, upconversion/downconversion, filtering, amplification, etc. In some embodiments, the circuitry 608 may include one or more processors. The circuitry 608 may be configured to perform functions based on instructions being stored in a RAM or ROM, or based on special purpose circuitry. The circuitry 608 may include processing circuitry and/or transceiver circuitry in accordance with some embodiments. The circuitry 608 may include a processor such as a general purpose processor or special purpose processor. The circuitry 608 may implement one or more functions associated with transmit/receive elements 601, the transceiver 602, the PHY circuitry 604, the MAC circuitry 606, and/or the memory 610.

In some embodiments, the circuitry 608 may be configured to perform one or more of the functions and/or methods described herein and/or in conjunction with FIGS. 1-6.

In some embodiments, the transmit/receive elements 601 may be two or more antennas that may be coupled to the PHY circuitry 604 and arranged for sending and receiving signals including transmission of the HEW packets. The transceiver 602 may transmit and receive data such as HEW PPDU and packets that include an indication that the HEW device 600 should adapt the channel contention settings according to settings included in the packet. The memory 610 may store information for configuring the other circuitry to perform operations for configuring and transmitting HEW packets and performing the various operations to perform one or more of the functions and/or methods described herein and/or in conjunction with FIGS. 1-6.

In some embodiments, the HEW device 600 may be configured to communicate using OFDM communication signals over a multicarrier communication channel. In some embodiments, HEW device 600 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 600 may use 4× symbol duration of 802.11n or 802.11 ac.

In some embodiments, an HEW device 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 601 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 600 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The following examples pertain to further embodiments. Example 1 is an apparatus of a wireless local-area network device. The apparatus including processing circuitry and transceiver circuitry configured to generate a packet comprising one or more sub-channels for one or more stations. Each sub-channel includes a common wake-up physical synchronization in a physical layer and a station dedicated wake-up preamble in a media access control (MAC) layer, where each station dedicated wake-up preamble comprises a wake-up identifier for a station of the one or more stations. The processing circuitry and transceiver circuitry further configured to further including transmit the packet to the one or more stations in accordance with orthogonal frequency division multiple access (OFDMA).

In Example 2, the subject matter of Example 1 can optionally include where the processing circuitry and transceiver circuitry are further configured to transmit the packet in accordance with a predefined wake-up schedule of the one or more stations.

In Example 3, the subject matter of Example 1 or Example 2 can optionally include where the one or more sub-channels have a bandwidth of one the following group: 2 mega Hertz (MHz), 2.03 MHz, 26 data tones, 5 MHz, 10 MHz, and 20 MHz.

In Example 4, the subject matter of Example 3 can optionally include where the packet is transmitted on a channel with a bandwidth of one of the following group: 2 mega Hertz (MHz), 2.03 MHz, 5 MHz, 10 MHz, 20 MHz, 40 MHz, 80 MHz, 160 MHz, and 320 MHz.

In Example 5, the subject matter of Example 4 can optionally include where the packet further comprises a legacy short-training field (L-STF), a legacy long training field (L-LTF), and a legacy signal (L-SIG) field before the common wake up physical synchronization and wherein the L-STF, L-LTF, and L-SIG are transmitted on the full bandwidth of the channel.

In Example 6, the subject matter of Example 5 can optionally include where the one or more stations are constrained from decoding the L-STF, L-LTF, and L-SIG.

In Example 7, the subject matter of any of Examples 1-6 can optionally include where the common wake-up physical synchronization indicates that the station of the one or more stations is to decode the station dedicated wake up preamble to determine if the wake-up identifier identifies the station.

In Example 8, the subject matter of any of Examples 1-7 can optionally include where the wake-up identifier is one from the following group: an identifier generated when the station associates with the wireless local-area network device, a group identifier identifying a group of stations, a unique signage generated when the station associates with the wireless local-area network device, and a unique signage generated based on association parameters when the station associates with the wireless local-area network device.

In Example 9, the subject matter of any of Examples 1-8 can optionally include where the wireless local-area network device is one from the following group: an Institute of Electrical and Electronic Engineers (IEEE) 802.11ax access point, a sensor hub, an IEEE 802.11ax sensor hub, an IEEE 802.11ax station, and an access gateway.

In Example 10, the subject matter of Example 9 can optionally include where the station is one or more from the following group: an Internet of Things wireless device, a battery constrained device, an IEEE 802.11ax station, and a narrow bandwidth device of less than 20 MHz.

In Example 11, the subject matter of any of Examples 1-10 can optionally include where the packet further comprises: a common physical layer element sub-field before the common wake-up physical synchronization.

In Example 12, the subject matter of any of Examples 1-11 can optionally include where the packet further comprises a signal A (SIG-A) sub-field after the station dedicated wake-up preamble.

In Example 13, the subject matter of Example 12 can optionally include where the packet further comprises a signal B (SIG-B) sub-field after the SIG-A sub-field, wherein the SIG-A sub-field comprises a modulation and coding scheme for the SIG-B sub-field.

In Example 14, the subject matter of any of Examples 1-13 can optionally include where the packet is transmitted in response to a query based trigger for the one or more stations, and wherein the sub-channels further comprise a query for the station to transmit a report to the HEW device.

In Example 15, the subject matter of any of Examples 1-14 can optionally include memory coupled to the processing circuitry and transceiver circuitry, and one or more antennas coupled to the transceiver circuitry.

Example 16 is a non-transitory computer-readable storage medium that stores instructions for execution by one or more processors. The instructions to configure the one or more processors to cause a wireless local-area network device to generate a packet comprising one or more sub-channels for one or more stations, each sub-channel comprising a common wake-up physical synchronization in a physical layer and a station dedicated wake-up preamble in a media access control (MAC) layer, where each station dedicated wake-up preamble comprises a wake-up identifier for a station of the one or more stations, and transmit the packet to the one or more stations in accordance with orthogonal frequency division multiple access (OFDMA).

In Example 17, the subject matter of Example 16 can optionally include where the instructions are further to configure the one or more processor to cause the wireless local-area network device to: transmit the packet in accordance with a predefined wake-up schedule of the one or more stations.

In Example 18, the subject matter of Example 16 or Example 17 can optionally include where the one or more sub-channels have a bandwidth of one the following group: 2 mega Hertz (MHz), 2.03 MHz, 26 data tones, 5 MHz, 10 MHz, and 20 MHz, and wherein the packet is to be transmitted on a channel with a bandwidth of one of: 2 mega Hertz (MHz), 2.03 MHz, 5 MHz, 10 MHz, 20 MHz, 40 MHz, 80 MHz, 160 MHz, and 320 MHz.

Example 19 is a method performed by a high-efficiency wireless local-area network (HEW) station. The method including generating a packet comprising one or more sub-channels for one or more stations, each sub-channel comprising a common wake-up physical synchronization in a physical layer and a station dedicated wake-up preamble in a media access control (MAC) layer, where each station dedicated wake-up preamble comprises a wake-up identifier for a station of the one or more stations, and transmitting the packet to the one or more stations in accordance with orthogonal frequency division multiple access (OFDMA).

In Example 20, the subject matter of Example 19 can optionally include where the one or more sub-channels have a bandwidth of one the following group: 2 mega Hertz (MHz), 2.03 MHz, 26 data tones, 5 MHz, 10 MHz, and 20 MHz, and wherein the packet is to be transmitted on a channel with a bandwidth of one of: 2 mega Hertz (MHz), 2.03 MHz, 5 MHz, 10 MHz, 20 MHz, 40 MHz, 80 MHz, 160 MHz, and 320 MHz.

Example 21 is an apparatus of a high-efficiency wireless local area network (HEW) station. The HEW station including processing circuitry and transceiver circuitry configured to configure the HEW station for operation in a shallow sleep mode, where in shallow sleep mode the HEW station is configured to enter non-shallow sleep mode in response to reception on a sub-channel of a common wake-up physical synchronization in a physical layer, and configure the HEW station for operation in a non-shallow sleep mode, wherein in non-sleep mode the HEW is configured to return to the shallow sleep mode if a wake-up identifier in a received station dedicated wake up preamble in a media access control (MAC) layer does not indicate the HEW station, and if the wake-up identifier does indicate the HEW station, receive a downlink communication or transmit an uplink communication, and return to shallow sleep mode.

In Example 22, the subject matter of Example 21 can optionally include where the common wake-up physical synchronization in the physical layer is a first part of a magic packet and the dedicated wake-up preamble in the MAC layer is a second portion of the magic packet.

In Example 23, the subject matter of Example 21 or Example 22 can optionally include where the sub-channel has a bandwidth of one the following group: 2 mega Hertz (MHz), 2.03 MHz, 26 data tones, 5 MHz, 10 MHz, and 20 MHz, and wherein the magic packet has a bandwidth of one of: 2 mega Hertz (MHz), 2.03 MHz, 5 MHz, 10 MHz, 20 MHz, 40 MHz, 80 MHz, 160 MHz, and 320 MHz.

In Example 24, the subject matter of any of Examples 21-23 can optionally include where in shallow sleep mode a portion of a MAC processor is asleep and in non-shallow sleep mode the portion of the MAC process is awake.

In Example 25, the subject matter of any of Examples 21-24 can optionally include memory coupled to the processing circuitry and transceiver circuitry, and one or more antennas coupled to the transceiver circuitry.

Example 26 is an apparatus of a wireless local-area network device. The apparatus including means for generating a packet comprising one or more sub-channels for one or more stations, each sub-channel comprising a common wake-up physical synchronization in a physical layer and a station dedicated wake-up preamble in a media access control (MAC) layer, where each station dedicated wake-up preamble comprises a wake-up identifier for a station of the one or more stations, and means for transmitting the packet to the one or more stations in accordance with orthogonal frequency division multiple access (OFDMA).

In Example 27, the subject matter of Example 26 can optionally include means for transmitting the packet in accordance with a predefined wake-up schedule of the one or more stations.

In Example 28, the subject matter of Example 26 or Example 27 can optionally include where the one or more sub-channels have a bandwidth of one the following group: 2 mega Hertz (MHz), 2.03 MHz, 26 data tones, 5 MHz, 10 MHz, and 20 MHz.

In Example 29, the subject matter of Example 28 can optionally include where the packet is transmitted on a channel with a bandwidth of one of the following group: 2 mega Hertz (MHz), 2.03 MHz, 5 MHz, 10 MHz, 20 MHz, 40 MHz, 80 MHz, 160 MHz, and 320 MHz.

In Example 30, the subject matter of Example 29 can optionally include where the packet further comprises a legacy short-training field (L-STF), a legacy long training field (L-LTF), and a legacy signal (L-SIG) field before the common wake up physical synchronization and wherein the L-STF, L-LTF, and L-SIG are transmitted on the full bandwidth of the channel.

In Example 31, the subject matter of Example 30 can optionally include where the one or more stations are constrained from decoding the L-STF, L-LTF, and L-SIG.

In Example 32, the subject matter of any of Examples 26-31 can optionally include where the common wake-up physical synchronization indicates that the station of the one or more stations is to decode the station dedicated wake up preamble to determine if the wake-up identifier identifies the station.

In Example 33, the subject matter of any of Examples 26-32 can optionally include where the wake-up identifier is one from the following group: an identifier generated when the station associates with the wireless local-area network device, a group identifier identifying a group of stations, a unique signage generated when the station associates with the wireless local-area network device, and a unique signage generated based on association parameters when the station associates with the wireless local-area network device.

In Example 34, the subject matter of any of Examples 26-33 can optionally include where the wireless local-area network device is one from the following group: an Institute of Electrical and Electronic Engineers (IEEE) 802.11ax access point, a sensor hub, an IEEE 802.11ax sensor hub, an IEEE 802.11ax station, and an access gateway.

In Example 35, the subject matter of Example 34 can optionally include where the station is one or more from the following group: an Internet of Things wireless device, a battery constrained device, an IEEE 802.11ax station, and a narrow bandwidth device of less than 20 MHz.

In Example 36, the subject matter of any of Examples 26-35 can optionally include where the packet further comprises: a common physical layer element sub-field before the common wake-up physical synchronization.

In Example 37, the subject matter of any of Examples 26-36 can optionally include where the packet further comprises a signal A (SIG-A) sub-field after the station dedicated wake-up preamble.

In Example 38, the subject matter of Example 37 can optionally include where the packet further comprises a signal B (SIG-B) sub-field after the SIG-A sub-field, wherein the SIG-A sub-field comprises a modulation and coding scheme for the SIG-B sub-field.

In Example 39, the subject matter of any of Examples 26-38 can optionally include where the packet is transmitted in response to a query based trigger for the one or more stations, and wherein the sub-channels further comprise a query for the station to transmit a report to the HEW device.

In Example 40, the subject matter of any of Examples 26-39 can optionally include means for receiving and transmitting radio frequency wave.

Example 41 is a method performed by a high-efficiency wireless local area network (HEW) station. The method including configuring the HEW station for operation in a shallow sleep mode, where in shallow sleep mode the HEW station is configured to enter non-shallow sleep mode in response to reception on a sub-channel of a common wake-up physical synchronization in a physical layer, and configuring the HEW station for operation in a non-shallow sleep mode, wherein in non-sleep mode the HEW is configured to: returning to the shallow sleep mode if a wake-up identifier in a received station dedicated wake up preamble in a media access control (MAC) layer does not indicate the HEW station, and if the wake-up identifier does indicate the HEW station, receiving a downlink communication or transmitting an uplink communication, and returning to shallow sleep mode.

In Example 42, the subject matter of Example 41 can optionally include where the common wake-up physical synchronization in the physical layer is a first part of a magic packet and the dedicated wake-up preamble in the MAC layer is a second portion of the magic packet.

In Example 43, the subject matter of Example 41 or 42 can optionally include where the sub-channel has a bandwidth of one the following group: 2 mega Hertz (MHz), 2.03 MHz, 26 data tones, 5 MHz, 10 MHz, and 20 MHz, and wherein the magic packet has a bandwidth of one of: 2 mega Hertz (MHz), 2.03 MHz, 5 MHz, 10 MHz, 20 MHz, 40 MHz, 80 MHz, 160 MHz, and 320 MHz.

In Example 44, the subject matter of Example 41-43 can optionally include where in shallow sleep mode a portion of a MAC processor is asleep and in non-shallow sleep mode the portion of the MAC process is awake.

Example 47 is an apparatus of a high-efficiency wireless local area network (HEW) station. The HEW station including means for configuring the HEW station for operation in a shallow sleep mode, wherein in shallow sleep mode the HEW station is configured to enter non-shallow sleep mode in response to reception on a sub-channel of a common wake-up physical synchronization in a physical layer, and means for configuring the HEW station for operation in a non-shallow sleep mode, wherein in non-sleep mode the HEW is configured to: means for returning to the shallow sleep mode if a wake-up identifier in a received station dedicated wake up preamble in a media access control (MAC) layer does not indicate the HEW station, and if the wake-up identifier does indicate the HEW station, means for receiving a downlink communication or means for transmitting an uplink communication, and means for returning to shallow sleep mode.

In Example 48, the subject matter of Example 47 can optionally include where the common wake-up physical synchronization in the physical layer is a first part of a magic packet and the dedicated wake-up preamble in the MAC layer is a second portion of the magic packet.

In Example 49, the subject matter of Example 47 or Example 48 can optionally include where the sub-channel has a bandwidth of one the following group: 2 mega Hertz (MHz), 2.03 MHz, 26 data tones, 5 MHz, 10 MHz, and 20 MHz, and wherein the magic packet has a bandwidth of one of: 2 mega Hertz (MHz), 2.03 MHz, 5 MHz, 10 MHz, 20 MHz, 40 MHz, 80 MHz, 160 MHz, and 320 MHz.

In Example 50, the subject matter of any of Examples 47-49 can optionally include where in shallow sleep mode a portion of a MAC processor is asleep and in non-shallow sleep mode the portion of the MAC process is awake.

In Example 51, the subject matter of any of Examples 47-50 can optionally include means for receiving and transmitting radio frequency waves.

Example 52 is a non-transitory computer-readable storage medium that stores instructions for execution by one or more processors. The instructions to configure the one or more processors to cause a high-efficiency wireless local area network (HEW) station to: configure the HEW station for operation in a shallow sleep mode, wherein in shallow sleep mode the HEW station is configured to enter non-shallow sleep mode in response to reception on a sub-channel of a common wake-up physical synchronization in a physical layer, and configure the HEW station for operation in a non-shallow sleep mode, wherein in non-sleep mode the HEW is configured to: return to the shallow sleep mode if a wake-up identifier in a received station dedicated wake up preamble in a media access control (MAC) layer does not indicate the HEW station, and if the wake-up identifier does indicate the HEW station, receive a downlink communication or transmit an uplink communication, and return to shallow sleep mode.

In Example 53, the subject matter of Example 52 can optionally include where the common wake-up physical synchronization in the physical layer is a first part of a magic packet and the dedicated wake-up preamble in the MAC layer is a second portion of the magic packet.

In Example 54, the subject matter of Example 52 or Example 53 can optionally include where the sub-channel has a bandwidth of one the following group: 2 mega Hertz (MHz), 2.03 MHz, 26 data tones, 5 MHz, 10 MHz, and 20

MHz, and wherein the magic packet has a bandwidth of one of: 2 mega Hertz (MHz), 2.03 MHz, 5 MHz, 10 MHz, 20 MHz, 40 MHz, 80 MHz, 160 MHz, and 320 MHz.

In Example 55, the subject matter of any of Examples 52-54 can optionally include where in shallow sleep mode a portion of a MAC processor is asleep and in non-shallow sleep mode the portion of the MAC process is awake.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point, the apparatus comprising: a memory; and processing circuitry, the processing circuitry comprising (Physical Layer) PHY circuitry and (Medium Access Control) MAC circuitry, the processing circuitry coupled to the memory,
wherein the processing circuitry is configured to:
encode a preamble, the preamble comprising a legacy short-training field (L-STF), a legacy long training field (L-LTF), and a legacy signal (L-SIG) field;
encode a common wake-up physical synchronization field as part of each packet of one or more packets, the one or more packets following the preamble; and
wherein the MAC circuitry is configured to:
encode a station dedicated wake-up preamble as part of each packet of the one or more packets, wherein each packet corresponds to a station of one or more stations;
encode the one or more packets in accordance with orthogonal frequency division multiple access (OFDMA); and
generate signaling to cause the one or more packets to be transmitted on a corresponding sub-channel of the one or more sub-channels, wherein the preamble is to be transmitted on a 20 MHz channel and the one or more packets are to be transmitted on sub-channels within the 20 MHz channel, and wherein the one or more sub-channels are each less than 20 MHz.

2. The wireless apparatus of claim 1, wherein the processing circuitry is further configured to:
transmit the one or more packets in accordance with a predefined wake-up schedule of the one or more stations.

3. The apparatus of claim 1, wherein the one or more sub-channels have a bandwidth of one the following group: 2 Mega-Hertz (MHz), 2.03 MHz, a second bandwidth having exactly 26 data tones, 5 MHz, and 10 MHz.

4. The apparatus of claim 1, wherein the common wake-up physical synchronization indicates that the station dedicated wake up preamble is to be decoded to determine if the wake-up identifier identifies the corresponding station of the one or more stations.

5. The apparatus of claim 1, wherein the wake-up identifier is one from the following group: an identifier generated when the station associates with the wireless local-area network device, a group identifier identifying a group of stations, a unique generated when the station associates with the wireless local-area network device, and a unique signage generated based on association parameters when the station associates with the wireless local-area network device.

6. The apparatus of claim 1, wherein the access point is one from the following group: an Institute of Electrical and Electronic Engineers (IEEE) 802.11ax access point, a sensor hub, an IEEE 802.11ax sensor hub, an IEEE 802.11ax station, and an access gateway.

7. The apparatus of claim 6, wherein each of the one or more stations is one or more from the following group: an Internet of Things wireless device, a battery constrained device, an IEEE 802.11 ax station, and a narrow bandwidth device of less than 20 MHz.

8. The apparatus of claim 1, wherein the PHY circuitry is further configured to generate a common physical layer element sub-field before the common wake-up physical synchronization field.

9. The apparatus of claim 1, wherein PHY circuitry is further configured to generate for each packet of the one or more packets a signal A (SIG-A) sub-field after the station dedicated wake-up preamble.

10. The apparatus of claim 9, wherein the PHY circuitry is further configured to generate for each packet of the one or more packets a signal B (SIG-B) sub-field after the SIG-A sub-field, wherein the SIG-A sub-field comprises a modulation and coding scheme for the SIG-B sub-field.

11. The apparatus of claim 1, wherein the one or more packets are to be transmitted in response to a query based trigger for the one or more stations, and wherein the MAC circuitry is further configured to generate for each packet of the one or more packets a query for the corresponding station to transmit a report to the access point.

12. The apparatus of claim 1 further comprising and one or more antennas coupled to the transceiver circuitry.

13. A non-transitory computer-readable storage medium that stores instructions for execution by one or more processors, the instructions to configure the one or more processors to:
encode a preamble, the preamble comprising a legacy short-training field (L-STF), a legacy long training field (L-LTF), and a legacy signal (L-SIG) field;
encode a common wake-up physical synchronization field as part of each packet of one or more packets, the one or more packets following the preamble; and
encode a station dedicated wake-up preamble as part of each packet of the one or more packets, wherein each packet corresponds to a station of one or more stations;
encode the one or more packets in accordance with orthogonal frequency division multiple access (OFDMA); and
generate signaling to cause the one or more packets to be transmitted on a corresponding sub-channel of the one or more sub-channels, wherein the preamble is to be transmitted on a 20 MHz channel and the one or more packets are to be transmitted on sub-channels within the 20 MHz channel, and wherein the one or more sub-channels are each less than 20 MHz.

14. The non-transitory computer-readable storage medium of claim 13, wherein the instructions are further to configure the one or more processor to:
transmit the one or more packets in accordance with a predefined wake-up schedule of the one or more stations.

15. The non-transitory computer-readable storage medium of claim 13, wherein the one or more sub-channels have a bandwidth of one the following group: 2 Mega-Hertz (MHz), 2.03 MHz, a second bandwidth having exactly 26 data tones, 5 MHz, and 10 MHz.

16. A method performed by a wireless local-area network device, the method comprising:

encoding a preamble, the preamble comprising a legacy short-training field (L-STF), a legacy long training field (L-LTF), and a legacy signal (L-SIG) field;

encoding a common wake-up physical synchronization field as part of each packet of one or more packets, the one or more packets following the preamble; and encoding a station dedicated wake-up preamble as part of each packet of the one or more packets, wherein each packet corresponds to a station of one or more stations;

encoding the one or more packets in accordance with orthogonal frequency division multiple access (OFDMA); and generating signaling to cause the one or more packets to be transmitted on a corresponding sub-channel of the one or more sub-channels, wherein the preamble is to be transmitted on a 20 MHz channel and the one or more packets are to be transmitted on sub-channels within the 20 MHz channel, and wherein the one or more sub-channels are each less than 20 MHz.

17. The method of claim 16, wherein the one or more sub-channels have a bandwidth of one the following group: 2 Mega-Hertz (MHz), 2.03 MHz, a second bandwidth having exactly 26 data tones, 5 MHz, and 10 MHz.

* * * * *